(12) United States Patent
Yeo et al.

(10) Patent No.: US 7,453,636 B2
(45) Date of Patent: Nov. 18, 2008

(54) HIGH CONTRAST OPTICAL PATH CORRECTED SCREEN

(75) Inventors: Terence E. Yeo, Boston, MA (US); Zane A. Coleman, Chicago, IL (US)

(73) Assignee: Fusion Optix Inc., Cambridge, MA (US)

( * ) Notice: Subject to any disclaimer, the term of this patent is extended or adjusted under 35 U.S.C. 154(b) by 134 days.

(21) Appl. No.: 11/225,941

(22) Filed: Sep. 13, 2005

(65) Prior Publication Data

US 2006/0066945 A1    Mar. 30, 2006

Related U.S. Application Data

(60) Provisional application No. 60/609,437, filed on Sep. 13, 2004.

(51) Int. Cl.
G03B 21/56 (2006.01)
G03B 21/60 (2006.01)

(52) U.S. Cl. .................. 359/453; 359/456; 359/460

(58) Field of Classification Search .................. 359/443, 359/452–453, 455–457, 460
See application file for complete search history.

(56) References Cited

U.S. PATENT DOCUMENTS

| | | | | |
|---|---|---|---|---|
| 4,773,731 A | * | 9/1988 | Goldenberg et al. | 359/457 |
| 4,934,798 A | * | 6/1990 | Bunch | 359/19 |
| 5,066,099 A | * | 11/1991 | Yoshida et al. | 359/457 |
| 5,724,182 A | * | 3/1998 | Mitani et al. | 359/457 |
| 5,932,342 A | | 8/1999 | Zeira et al. | 428/327 |
| 6,239,907 B1 | * | 5/2001 | Allen et al. | 359/443 |
| 6,295,162 B1 | * | 9/2001 | Miyata | 359/453 |
| 6,989,929 B2 | * | 1/2006 | Watanabe | 359/457 |

OTHER PUBLICATIONS

Nitto Denko *Press Release*, Nov. 11, 2003, 2 pages, http://www.nitto.com/company/release/03_11_11/index.html.
Shikama et al. *SID Digest*, 46.2:1250-1253 (2002).

* cited by examiner

*Primary Examiner*—Christopher Mahoney (57) ABSTRACT

By using high and low refractive index materials, a planarized reflective-refractive Fresnel lens and a planarized refractive lenticular lens can be created. These flat screen components eliminate the need for an air-gap, thus reducing the screen thickness. Additionally, this allows for the screen to be manufactured on a roll-to-roll process that can significantly reduce the screen cost. By adding the capability of planarizing the elements, they can be combined in a final structure on a roll-to-roll process. Since the Fresnel lens can be combined with the lenticular lens before exposure of the black stripe region, the exposure of the black stripe region can account for any deviation from true collimation or non-normal angle of incidence of the light path in the projection system design.

29 Claims, 7 Drawing Sheets

HIGH CONTRAST OPTICAL PATH CORRECTED SCREEN

RELATED APPLICATIONS

This application claims the benefit of priority under 35 U.S.C. 119(e) to U.S. Provisional Application Nos. 60/609,437, filed on Sep. 13, 2004, the entire contents of which is incorporated herein by reference. Related applications are Ser. Nos. 11/197,246 and 11/200,592, the entire contents of which are incorporated herein by reference.

FIELD OF THE INVENTION

The invention generally relates to imaging screen elements, an optical path corrected imaging screen and methods of manufacture.

BACKGROUND OF THE INVENTION

Screen components in projection TVs need to be reduced in thickness, to reduce total screen costs and create a thinner form factor, i.e., reduce bulk. Current configurations provide air gaps in-between screen components that can accumulate dirt or dust, materials that degrade image quality. The air gap also increases the cost of manufacturing, and the thickness of the system.

The traditional air gap used for Fresnel lenses used in projection TVs does not allow for lamination or combination of the Fresnel lens and other components in the screen. For example, Shikama has described a hybrid reflection-refraction Fresnel lens/screen in *SID Proceedings* 2002, p. 1252. While offering an improvement by lowering the F/# achievable with a Fresnel lens, this screen is described as using an air gap. Traditional Fresnel lenses are described in *Projection Displays*, Stupp and Brennesholtz, (Wiley and Sons 1999) wherein air gaps are shown.

The lenticular lens also uses an air gap to achieve the desired refraction and increased screen contrast. Improvements in lenticular lens technology include using aspheric lens shapes to improve the screen contrast by increasing the area of the black stripe region while maintaining throughput. However, this technology is also described as using an air gap, increasing the complexity of manufacturing, and the overall screen thickness.

Screen contrast needs to be improved in order for displays to perform well in bright ambient light environments. Lamp life is an important issue with projection displays, and one method for increasing lamp life is to increase system throughput. The relative positions of the light source, lenses and contrast enhancement elements of a projection screen can have an effect on screen throughput. For example, the Fresnel lens has a fixed focal length, and any variation from this in design or production of the Fresnel lens, position of the projection lens, position of the light source, position of the folding or aspheric mirrors in the system can cause a significant amount of light to be absorbed by the contrast enhancing element.

In other words, in many rear projection display systems, the light from a projection lens that passes through the Fresnel lens and lenticular lens does not form bright lines of light with constant line thicknesses, constant pitch, or parallel lines light on the black stripe region. If light is not perfectly collimated and parallel to the optic axis, then the black stripe regions may absorb more of the system intensity than is desired, thus reducing screen throughput. With most system designs, the exact angle and degree of collimation of the light incident on the screen can vary, and designing each screen component to account for these variations individually can be cost prohibitive. To counteract for these issues, systems and screen components are either designed with very high tolerances or suffer reduced brightness or contrast.

Fresnel reflections can also reduce the system throughput and can result in ghost images in certain situations. The ability to reduce these reflections is limited because low-cost anti-reflection coating techniques typically require planarized surfaces.

Complete screens for high resolution, high contrast projection displays are manufactured using non-continuous assembly techniques. In order to reduce the cost of manufacturing, techniques for producing a screen would need a complete roll-to-roll manufacturing method.

SUMMARY OF THE INVENTION

The present invention provides rear projection screens that are thinner and that can be manufactured cheaply using roll-to-roll processes. The screens of the invention also offer increased throughput and higher contrast. By using planar materials having a differential refractive index, an optical element suitable for use in projection screens, having improved contrast and brightness, is provided. These flat screen components eliminate the need for an air gap between the light-redirecting array, e.g., Fresnel lens, and the other screen components, which thus reduces the screen thickness. This allows for the screen to be manufactured on a roll-to-roll process, that can significantly reduce the screen cost. By adding the capability of planarizing the elements, they can be combined in a final structure on a roll-to-roll process. Since the Fresnel lens can be combined with the lenticular lens before exposure of the black stripe region, the exposure of the black stripe region can account for any deviation from true collimation, de-centering, or non-normal angle of incidence of the light path in the projection system design.

Accordingly, in an embodiment, the invention includes an optical element having a first substantially planar element having a first refractive index $n_{x1}$, a first light-receiving surface, and a first light-transmitting surface; a second substantially planar element having a second refractive index $n_{x2}$, a second light-receiving surface, and a second light-transmitting surface, wherein the first light-transmitting surface and the second light-receiving surface cooperatively form an array for redirecting light transmitted through the first and second elements, and $n_{x1} \neq n_{x2}$. The relative and respective values of $n_{x1}$ and $n_{x2}$ may be chosen as needed, and depending on the end used (i.e., where the light source is with respect to the screen.) In an embodiment, the array may be, e.g., a Fresnel lens or a lenticular lens. Desirably, the interface between the first light-transmitting surface and the second light-receiving surfaces is optically coupled. The optical element may be used as a lens array, collimating lens, an imaging screen, projection screen, light integrator (e.g. for uniformity) or other optical element that specularly or diffusely re-directs incident light.

In an embodiment of the invention, one or more of the screen elements may scatter light, e.g., may include light scattering particles such as spherical particles, birefringent particles or asymmetric scattering particles.

Desirably an embodiment of the invention includes an optical layer such as anti-reflective coating, anti-glare surface, reflective coating, and contrast-enhancing regions, on the second light-transmitting surface of the second element. More desirably the coating is a contrast enhancing region comprising sub-regions varying in concentration of a visible light absorbing material, such as a black-stripe coating.

In another embodiment, the invention relates to projection screens having a first substantially planar element having a first refractive index $n_{x1}$, a first light-receiving surface, and a first light-transmitting surface, and a second substantially planar element having a second refractive index $n_{x2}$, a second light-receiving surface, and a second light-transmitting surface, wherein the first light-transmitting surface and the second light-receiving surfaces cooperatively form an array for redirecting light transmitted through the first and second elements, and $n_{x1} \neq n_{x2}$; a Fresnel lens element disposed on the first light-receiving surface; and a contrast enhancing region disposed on the second light-transmitting surface, wherein the contrast enhancing sub-regions are alternating light transmissive and light absorbing stripes.

In another embodiment, the invention relates to a method of manufacturing an optical element.

DETAILED DESCRIPTION OF THE INVENTION

The features and other details of the invention will now be more particularly described. It will be understood that particular embodiments described herein are shown by way of illustration and not as limitations of the invention. The principal features of this invention can be employed in various embodiments without departing from the scope of the invention. All parts and percentages are by weight unless otherwise specified.

Definitions

For convenience, certain terms used in the specification and examples are collected here.

"Speckle", often referred to also as scintillation, includes the optical interference pattern visible on a scattering element or perceived as coming from or near a scattering element. This can include color or intensity variations within an small area of interest.

"Speckle Contrast" is defined herein to include the ratio of the standard deviation of the intensity fluctuation to the mean intensity over the area of interest.

"Scatter," "Scattering," "Diffuse" and "Diffusing" as defined herein includes light scattering by reflection, refraction or diffraction from particles, surfaces, or layers.

"Optically coupled" is defined herein as including the coupling, attaching or adhering two or more regions or layers such that the intensity of light passing from one region to the other is not substantially reduced due to Fresnel interfacial reflection losses due to differences in refractive indices between the regions. Optical coupling methods include joining two regions having similar refractive indices, or by using an optical adhesive with a refractive index substantially near or in-between the regions or layers such as Optically Clear Adhesive 8161 from 3M (with a refractive index at 633 nm of 1.474). Examples of optically coupling include lamination using an index-matched optical adhesive such as a pressure sensitive adhesive; coating a region or layer onto another region or layer; extruding a region or layer onto another region or layer; or hot lamination using applied pressure to join two or more layers or regions that have substantially close refractive indices. A "substantially close" refractive index difference is about 0.5, 0.4, 0.3 or less, e.g., 0.2 or 0.1.

"Screen assembly" is defined herein as a single or combination of elements that can be components of a rear projection screen or alternatively an assembly suitable as a rear projection screen without the need for additional elements.

"Hardcoating" or "Hardcoat" is a coating applied to a surface of a screen element that hardens the surface of the screen element, thus reducing the appearance of scratches and protecting the screen element. Hardcoats can include anti-glare or surface relief characteristics or they can be coating onto surface relief structures providing anti-glare properties.

Screen resolution is defined as the smallest perceivable detail in an image. It is typically measured by projecting a pattern of alternating bright and dark lines on a projection screen and measuring the intensity of the image as described in VESA FPDM standard 303-7. From the intensity scan in the horizontal or vertical direction, the modulation depth of the intensity can be calculated for various line pairs per millimeter of the original pattern or image. The key resolution parameter is often defined as the highest number of lines per millimeter with an intensity modulation depth of 20% (as defined by Goldenberg et. al.). The independent performance of a projection screen is measured with a very high contrast pattern without using the projection engine of the screen in order to ascertain the screen's performance. The curve of contrast modulation versus line pairs per millimeter illustrates the resolution of the screen graphically. For example, a 55 inch 1080p High-Definition projection TV has a resolution of approximately 3.15 line pairs per millimeter. A similar 40 inch projection TV has a resolution of 4.34 line pairs per millimeter.

The "Gain" of a screen or light scattering element is the ratio of the maximum luminance of an illuminated light transmitting material in a given direction relative to the luminance of a theoretically perfect diffuser in the same direction. To measure the gain of a particular sheet of material, a known amount of light is directed to the sheet, and the maximum luminance is measured using a standard luminance meter. The maximum luminance of light measured is then compared to a theoretically "perfect" diffusive material.

The gain for an imperfect diffuser is the value of the maximum intensity (ML) divided by the value of the luminance of the theoretically perfect diffuser. For a theoretically perfect transmissive Lambertian diffuser material, providing one foot-candle (10.76 lumen/m$^2$) of illumination to the material results in the luminance of one footlambert at all angles. Therefore, if the maximum intensity of luminance transmitted by a material is equal to one footlambert, its gain with respect to a theoretical diffuser is 1.0 for that angle of transmission. For imperfect diffusers the gain will be maximum (ML) and larger than 1 for a given viewing direction (typically measured orthogonal to the plane of the diffuser).

Thus a high gain screen will typically be brighter when viewed orthogonal to the plane than at other angles. Because the light transmitted by the material can never be more than the amount of light supplied, less light must be transmitted at angles other than the angle of maximum intensity.

"Angle of view" (AOV) is a measurement of luminance for all angles relative to two perpendicular axes in the plane of the material. These are called the X axis or the horizontal axis, and the Y axis or the vertical axis. The angle of view is measured by applying a "full-width at half maximum" approach, a "full-width at one-third maximum" approach, and a "full-width at one-tenth maximum approach." The AOV at full-width at half maximum ($\alpha(\frac{1}{2})$) is calculated from sum of the absolute value of the angles (measured from an orthogonal to the plane of the material) at which the luminance at one-half the maximum luminance is measured and noted. For example, if angles of +35° and −35° were measured to have one-half of the maximum luminance in the horizontal direction, the AOV $\alpha(\frac{1}{2})$ in the horizontal direction for the screen would be 70°. The AOV at full-width at one-third maximum ($\beta(\frac{1}{3})$) and the AOV at full-width at one-tenth maximum ($\lambda(\frac{1}{10})$) are calculated similarly, except that they are calculated from the angles at which the luminance is one-third and one-tenth of the maximum light intensity respectively.

The "asymmetry ratio" is the horizontal AOV $\alpha(\frac{1}{2})$ divided by the vertical AOV $\alpha(\frac{1}{2})$, and thus is a measure of the degree of asymmetry between the horizontal luminance and the vertical luminance of the diffuser.

A "spheroidal" or "symmetric" particle includes those substantially resembling a sphere. A spheroidal particle may contain surface incongruities and irregularities but has a generally circular cross-section in substantially all directions. A spheroid is a type of ellipsoid wherein two of the 3 axes are equal. An "asymmetric" particle is referred to here as an "ellipsoidal" particle wherein each of the three axis can be a different length. Typically, ellipsoidal particles resemble squashed or stretched spheres.

"Planarized," "Planarization," and "Planar," includes creating a substantially flat surface on an element. A flat surface refers to one that does not have a substantially varying surface normal angle across a surface of the element. More than one surface may be planarized. As typically used herein, a material region is combined with a surface of an element that has a surface structure such that the surface of the material opposite the element is substantially planar. Typically, planarized films or components can be easily laminated to another element using pressure sensitive adhesives or hot-lamination without trapping air bubbles of sufficient size to affect the optical performance of the combined element. Coatings, such as thin coatings used in some anti-reflection coatings can be applied more uniformly to planarized elements.

The second substantially planar element has a second refractive index $n_{x2}$, a second light-receiving surface, and a second light-transmitting surface. The second light receiving surface may include a reverse Fresnel lens structure with blades designed for refraction and reflection. The element may be molded or embossed from a low refractive index material, such as aerogels, sol-gels or plastics with microscopic pores. The low refractive index material may be, e.g., between 1.01 (such as Silica Aerogel from Marketech International Inc.) and 1.47 (such as used in optical adhesives). In a preferred embodiment, the aerogel is a polymer containing micro-pores less than 100 nm in size that is capable of being cast, coated, or embossed into an array.

The first substantially planar element has a first refractive index $n_{x1}$, a first light-receiving surface, and a first light-transmitting surface. The first substantially planar element may be made by coating, i.e., onto the second light-receiving surface, a high refractive index material such as Nitto Denko's high-refractive index thermosetting polymer capable of reaching a refractive index of 1.76 (See Nitto Denko Press Release, 11 Nov. 2003, at http://www.nitto.com/company/release/03_11_11/index.html). Light that encounters a high refractive index-low refractive index interface can totally internally reflect if the angle is larger than the critical angle. The interfaces may be designed to reflect the light in a radially varying pattern such that they collimate the light from the "point" light source of a projector. The interfaces may also be designed such that the light reaching the interface at a designed angle will refract to a near normal angle due to the refractive index difference between the high and low refractive index materials. In some designs, the Fresnel lens and its use in a projection system is designed to work in off-axis, de-centered, or non-collimating conditions to achieve more desirable range of optical output angles.

In one embodiment, the light-transmitting elements are composed of a matrix material that is preferably durable, stable, and allows optical coupling to other materials, such as a hardcoat, an anti-reflective coating, or a contrast enhancement layer. Suitable matrix materials include acrylics, such as polymethylmethacrylates; polyesters; polystyrenes; polyolefins, such as polyethylenes, polypropylenes, and their copolymers; polyamides; organic acid cellulose esters, such as cellulose acetate butyrates, cellulose acetates, and cellulose acetate propionates; and polycarbonates. The matrix may also include compatibilizers to improve the processing and performance of the material. In a preferred embodiment, Spectar 14471 copolyester from Eastman Chemical Company may be used.

Types of asymmetric light scattering features which may be used in the invention include volumetric and surface relief. Surface relief and volumetric asymmetric light scattering elements can be combined. "Asymmetric light scattering surfaces" include diffractive structures, refractive structures, and reflective structures in small or high frequencies or modulations. One or more characteristics of the surface patterns or features may be regular, random, or partially random. Surface relief structures herein include those that refract, diffract, scatter, diffuse, reflect or otherwise alter the direction, angular extent or divergence of incident light, independently of how they are made. For example, surface features recorded holographically and then stamped or embossed into a surface are included as surface relief structures. Undulations on the surface of a material due to exposure to radiation that ablates material or alters the physical, chemical, or optical properties are also deemed surface relief structures. Surface relief structures are typically on a surface of a material exposed to air, although when they are embedded within a medium, they can effectively create a volumetric, asymmetric light scattering region.

Volumetric, asymmetric light scattering elements may include asymmetrically shaped particles within a host matrix material, graded-refractive index (GRIN) lenses or regions, physically, holographically or optically formed asymmetric regions. The light scattering features within the bulk volume of material may vary in size, shape, concentration, and composition, providing that the refractive index within the volume of the material varies in at least one of the x, y, or z directions sufficiently to asymmetrically scatter incident light. Example of asymmetric, volumetric scattering materials include stretched asymmetric particles in a host matrix material, radiation exposed photopolymers that enable refractive index variations, asymmetrically shaped voids or regions of materials or elements that differ in refractive index of the host matrix material, and embedded surface relief features.

The thickness of one or more of the volumetric asymmetric light scattering regions affects the resolution and the speckle contrast. In one embodiment, the thickness of one or more of the asymmetric light scattering regions is less than 10 mm. In another embodiment, the thickness may be less than 9, 8, 7, 6 or 5 mm. In another embodiment, the thickness may be less than 3 mm. In a more preferred embodiment, the thickness of one or more of the asymmetric light scattering regions is less than 2 or 1 mm.

Asymmetric particles can be added to the multi-region light scattering element or they can be created during manufacturing in order to obtain one or more regions with asymmetric light scattering characteristics. In one embodiment of this invention, a multi-region light scattering element is created when particles not substantially asymmetric in shape may be stretched along an axis after coating or during or after an extruding process such that they become asymmetric in shape. Other methods for achieving a single region of asymmetric particles in a region are disclosed in U.S. Pat. No. 5,932,342, the text of which is incorporated herein by reference. By using multiple layers or multi-region methods such as co-extrusion, optical lamination, optical coupling, thermal bonding, multiple regions containing light scattering particles can be combined into a single light scattering element. The degree of stretching can control the asymmetry and thus achieve a desired level of asymmetric light scattering. The asymmetric particles may have a large variation in size depending on the desired level of asymmetry.

The asymmetric particles in at least one region of a multi-region light scattering element can be obtained by reducing particles in size in the x, y or other directions by stretching a film after extrusion. These particles have a refractive index $n_{p1}$ different from the host matrix material refractive index $n_{h1}$ defined by at least one of $|n_{hx1}-n_{px1}| \gtrsim 0.001$, $|n_{hy1}-n_{py1}| \gtrsim 0.001$, or $|n_{hz1}-n_{pz1}| \gtrsim 0.001$ such that sufficient light scattering for the desired viewing angle is achieved. In a preferred embodiment, the particles are located in more than one region with the regions spaced apart by a non-scattering region of the host matrix material.

The asymmetric features, e.g., particles, typically are all oriented with their major axes substantially in one direction parallel to the plane of the surface of the material. Desirably, the particles are made from a material which is capable of being deformed at a processing temperature in order to create their asymmetric or ellipsoidal shape by stretching. Particles such as glass beads or cross-linked acrylic beads are not suitable for this application because they can not be stretched at processing temperatures suitable for manufacturing. Further, the volume density of the particles, the average ellipsoidal particle minor axis size, and the index of refraction the ellipsoidal particles may be optimized to control the horizontal viewing angle and other desired properties of the material.

The average particle size of the particles in the matrix may be from about 1 μm to about 30 μm, preferably from about 2 μm to about 15 μm, and most preferably from about 2 μm to about 5 μm in the minor dimension.

The differential refractive index ($\Delta n_{ME}$) defined as the absolute value of the difference between the index of refraction of the matrix ($n_M$) and the index of refraction of the ellipsoidal particles ($n_E$), or $|n_M-n_E|$, may be from about 0.005 to about 0.2, and preferably is from about 0.007 to about 0.1.

Suitable materials for the particles include acrylics such as polymethylacrylates; polystyrenes; polyethylenes; polypropylenes; organic acid cellulose esters such as cellulose acetate butyrates, cellulose acetates, and cellulose acetate propionates; polycarbonates; silicones; or glass spheres. The particles may also contain coatings of higher or lower refractive index materials, or they may be hollow materials containing a gas mixture such as air. In a preferred embodiment, polyethylene may be used.

The differential refractive index ($\Delta n_{MS}$) defined as the absolute value of the difference between the index of refraction of the matrix ($n_M$) and the index of refraction of the particles ($n_S$), or $|n_M-n_S|$, may be from about 0.005 to about 0.2, and preferably is from about 0.007 to about 0.1.

The field lens in a projection screen (such as a Fresnel lens, a hybrid Fresnel lens, or a high and low refractive index Fresnel lens) could be optically coupled to the high and low refractive index lenticular lens. A cost savings for assembly and separate component costs can be realized by being able to laminate (or otherwise adhere) these components together. Elimination of the air gap can reduce the total thickness of the screen and reduce the manufacturing cost. This could potentially enable web processing of the film and speed the production and lower the cost. A key element of this invention is the replacement of the air and traditional plastic material with a high and low refractive index materials such that the air gap can be eliminated.

Typically, the Fresnel lens is added as a component of the screen after the black stripe region has been formed or it is combined with the lenticular lens before formation of the black stripes. Collimated light is typically used when exposing the black stripe region through the lenticular lens. This does not allow for any deviation of light from the projection engine and Fresnel lens from normal incidence or true collimation. In one embodiment of this invention, a planarized high-low refractive index Fresnel lens is combined with a planarized high-low refractive index lenticular lens. Radiation simulating the angle of incidence and location of the projection engine light profile is directed through the Fresnel lens and lenticular lens onto the radiation sensitive region. The pattern of radiation reaching the light sensitive material is therefore adjusted for any deviation from collimation, de-centering, or non-normal angle of incidence. This exposure will determine the size and shape of the clear apertures and black stripes post processing.

By creating a single, combined element screen, the light from a light source can be used to accurately create the clear apertures in the black stripe material that correspond more accurately to the end-use projection system. The single element corrects the optical path and aligns it to the position and angular range of the light from the projection lens. This enables accurate exposure of the black stripe material, creating more precisely matched clear apertures, thus optimizing the throughput of the system and increasing the screen contrast. In some applications, the resulting clear apertures may resemble transparent lines, however, other shapes, features or openings may also be created. For example, when off-axis, de-centered, or non-collimating Fresnel lenses are used, the apertures after the cylindrical lens may vary in size, shape, orientation (non-parallel, for example), pitch (non-constant, for example) in different regions of the contrast enhancing region. In conventional systems, the light from the Fresnel lens is not exactly collimated and it is sometimes desired to have the light over or under collimated (diverging or converging). Conventional lenticular lens arrays are not normally adjusted for this range of angular deviations from collimation (it is usually optimized for collimated light), thus a significant portion of the light is absorbed and the optical path is not corrected. The present invention allow for use of Fresnel lens structures in a larger range of under-corrected or over-corrected conditions. In addition to the angular range optical path correction, the source location can be corrected. For example, in some situations, the light from a rear-projection TV is designed to be off-axis such that less light is directed toward the floor. This can be accomplished by placing the light source below the central axis of the Fresnel lens structure. However, this affects the light profile from the lenticular lenses, resulting in non-uniform line shapes. In a traditional system, a portion of this light will be either absorbed (not making it through the narrow parallel apertures) or in the case of using wider, parallel clear apertures, less ambient light will be absorbed and the contrast will be reduced.

Additionally, because either side of the screen is substantially planer, the screen may be laminated to a rigid substrate. The planarized optical element of the invention can be used with the higher refractive index portion on the side of the projection lens so that the light is substantially refracted before reaching the surface relief profile. This will enable it to collimate larger angles and thus enable larger screens.

The planar optical element of the invention is a new technology that can enable a single piece screen to be assembled. Traditionally, the exposure of the black stripe region is done through the lenticular lens only and it is commonly assumed that the light in the final system will be substantially collimated. One would not normally consider the effects of the off-axis illumination (or under or over collimation) from a Fresnel lens in the exposure of the black stripe material because of the complication of fixing the final Fresnel lens parameters, including its spacing from the lenticular lens. By using the new high-low refractive index lenticular lens technology, the lenticular lens can be optically coupled to the Fresnel lens before the light sensitive material is exposed. The optical path correction can also enable more than one black stripe region to be used to further enhance the contrast of the screen by absorbing more ambient light. This will limit the angles through which the ambient light can pass through the clear apertures and degrade the screen contrast.

Figure 1:
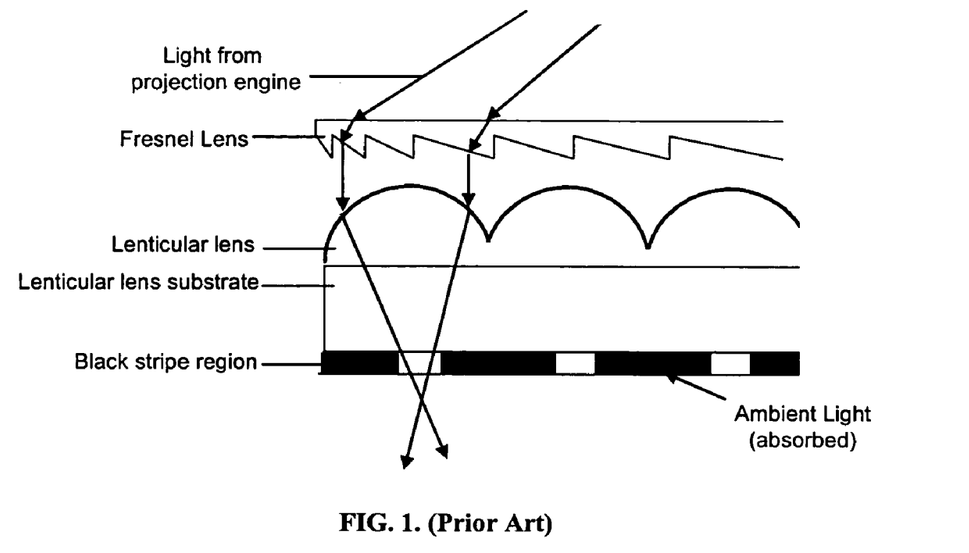
FIG. 1 is a cross-sectional side view of a portion of a Prior Art rear projection screen composed of a Fresnel lens, lenticular lens and a black stripe region.

FIG. 1 shows a schematic cross-sectional side view of prior art of a portion of a typical rear projection screen. Light from a projection engine is substantially collimated by a Fresnel lens. There is an air gap between the Fresnel lens and a lenticular lens. The light from the Fresnel lens is focused through the lenticular and through clear apertures in a black stripe region. A large percentage of ambient light is absorbed due to the black stripe regions, thus giving the screen a reasonable contrast in high ambient light conditions.

Figure 2:
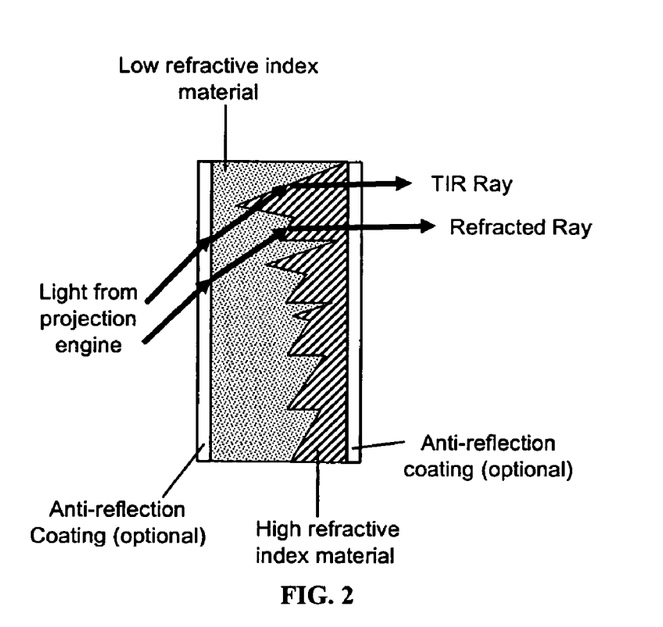
FIG. 2 is a cross-sectional side view of one embodiment of a screen element of the invention designed for incident light to enter the low refractive index region before the high refractive index region.

FIG. 2 illustrates one embodiment of a planarized Fresnel lens. The Fresnel lens has a low and high refractive index region wherein the lens is designed for light to pass through the low refractive index region and refract or TIR within the high refractive index region. The resulting light can be substantially collimated or focused if desired. Because the Fresnel lens has been planarized, it can easily be combined with other elements by optical coupling methods such as lamination. This can eliminate an air gap, reduce system thickness, and decrease the cost of manufacture by enabling roll-to-roll assembly. Anti-reflection coatings can be easily applied to the surfaces of the Fresnel lens because of the planarized surface. In the example shown, diverging light from a projection engine is collimated by the planarized hybrid Fresnel lens. The Fresnel lens can be manufactured using various high and low refractive index materials. One or both of the materials can be coated onto other materials including substrates. The blades can be embossed, stamped, cast or molded into the medium as known by those skilled in the art. The angles of the blades can be designed for a reflection based "Fresnel lens", a refraction based "Fresnel Lens" or a hybrid Fresnel lens based on reflection and refraction. Anti-reflection coatings can be applied by traditional coating or deposition techniques known to those in the field. The Fresnel lens can be used in rear projection application or a front projection application or other known applications for a Fresnel lens including overhead projectors.

Figure 3:
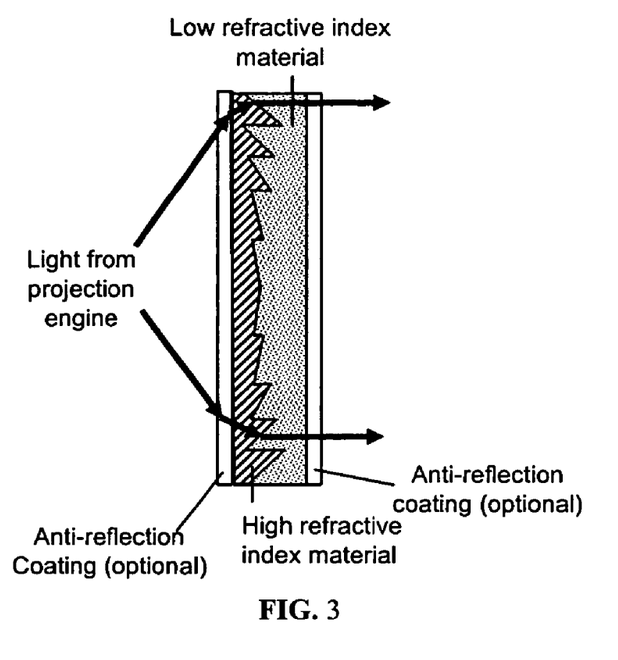
FIG. 3 is a cross-sectional side view of one embodiment of a screen element of the invention designed for incident light to enter the high refractive index region before the low refractive index region.

FIG. 3 illustrates another embodiment of a planarized Fresnel lens wherein the lens is designed to pass light through the high refractive index material before the low refractive index material. This design is typically desired in rear projection applications because the light can be collimated from steeper angles. A tradeoff of this geometry has been that the air gap is needed between the Fresnel lens and the lenticular lens. The Fresnel lens of FIG. 3 may also have anti-reflection coatings and can be easily applied to a substrate or other element via lamination or other optical or mechanical coupling techniques.

Figure 4:
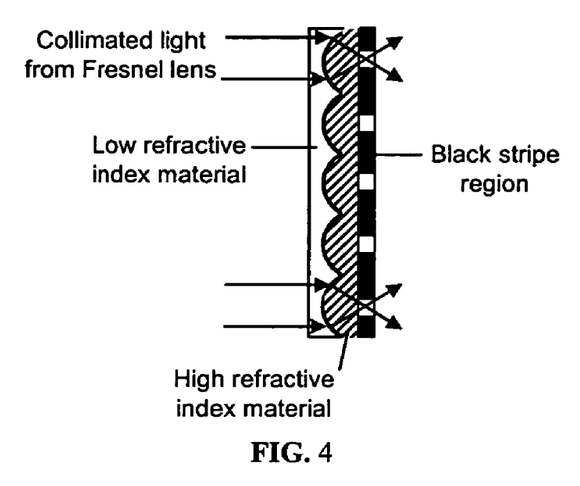
FIG. 4 is a cross-sectional side view of one embodiment of a screen element of the invention combined with a black stripe region designed for incident light to enter the low refractive index region before the high refractive index region.

FIG. 4 illustrates one embodiment of a planarized lenticular lens. The lenticular lens has a low and high refractive index region wherein the lens is designed for light to pass through the low refractive index region and refract within the high refractive index region. The resulting light can be substantially focused through a black stripe region if desired. Because the Fresnel lens has been planarized, it can easily be combined with other elements by optical coupling methods such as lamination. This can eliminate an air gap, reduce system thickness, and decrease the cost of manufacture by enabling roll-to-roll assembly. Anti-reflection coatings can be easily applied to the surfaces of the lenticular lens because of the planarized surface. In the example shown, collimated light from a projection engine is focused by the planarized lenticular lens through clear apertures in a black stripe region. The planarized lenticular lens can be manufactured using various high and low refractive index materials. One or both of the materials can be coated onto other materials including substrates. The lenticules can be embossed, stamped, cast or molded into the medium as known by those skilled in the art. Anti-reflection coatings can be applied by traditional coating or deposition techniques known to those in the field. One or more diffusive elements or layers may be used within or optically coupled to the planarized lenticular lens. These elements may be surface relief structures (regular, random, a mixture of random and regular, holographically designed, etc) on the elements themselves or on a separate substrate or volumetric diffusive elements (symmetric, asymmetric, particulate, stretched particulate, etc). For example a volumetric diffuser may be laminated between the black stripe layer and the lenticular lens or it may be laminated on the opposite side of the black striped material from the lenticular lens.

Figure 5:
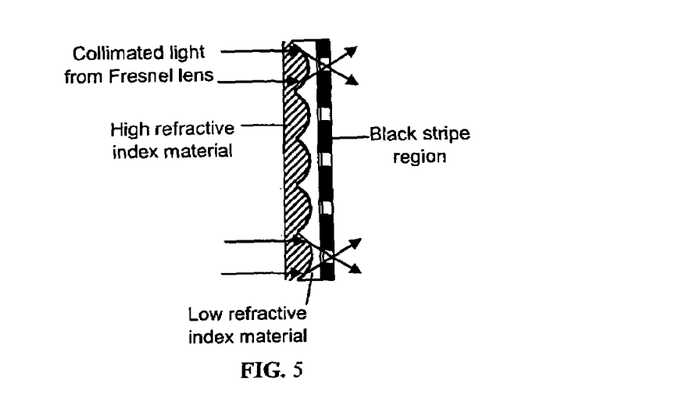
FIG. 5 is a cross-sectional side view of one embodiment of a screen element of the invention combined with a black stripe region designed for incident light to enter the high refractive index region before the low refractive index region.

FIG. 5 illustrates another embodiment of a planarized lenticular lens wherein the lens is designed to pass light through the high refractive index material before the low refractive index material. This configuration can open up the design of the lenticular lens to focus light at very short focal distances from the lens. Typically, this would require a very thin lenticular lens that can be difficult to manufacture. The planarized lenticular lens is shown in FIG. 5 for a rear projection application wherein collimated light from a projection engine is focused by the high refractive index lenticules through the low refractive index region into the black stripe region. The planarized lenticular lens of FIG. 5 may also have anti-reflection coatings and can be easily applied to a substrate or other element via lamination or other optical or mechanical coupling techniques.

Figure 6:
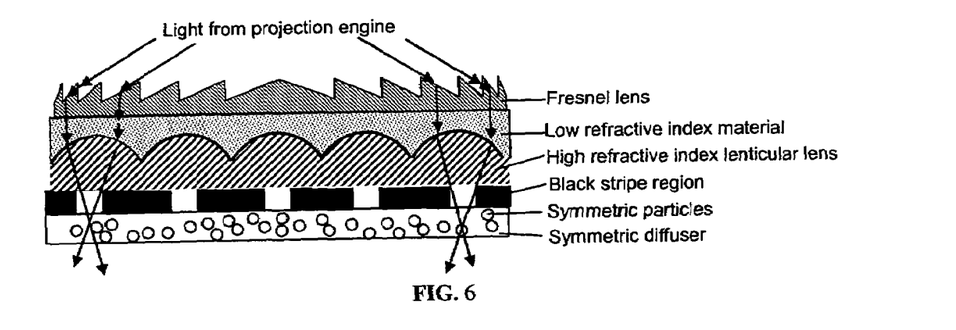
FIG. 6 is a cross-sectional side view of one embodiment of a high contrast optical path corrected screen of the invention wherein a Fresnel lens is optically coupled to an optical element of the invention with a black stripe region between the second element ("high refractive index lenticular lens"), and a symmetric diffuser.

The planarized Fresnel lens of this invention can be optically coupled to a lenticular lens with a light sensitive material that can be processed to produce black stripes (such as Chromalin by DuPont). This combination can be combined with a diffusive material and substrate to create a multi-element combined screen without an air gap. A traditional Fresnel lens may also be combined with a planarized lenticular lens as shown in FIG. 6. With the different configurations of multi-element combined screens without air gaps described herein, the coating, extruding, and embossing or molding of the layers and the optical coupling can be performed in different sequences in order to suit desirable manufacturing techniques (including light exposures of materials or curing). Glue layers or adhesion layers may be used in-between components and substrates for the components may also be desired.

One embodiment of a high contrast optical path corrected screen is shown in FIG. 6. A traditional Fresnel lens is optically coupled to the low refractive index region of a planarized lenticular lens. A black stripe region is located between the planarized lenticular lens and a symmetric diffuser. As shown, the Fresnel lens is a hybrid type, but it is understood that the Fresnel lens may be of a refractive only type. Diverging light from a projection engine is substantially collimated by the Fresnel lens and then focused by the planarized lenticular lens through the clear apertures. After exiting the apertures, the light is diffused by a symmetric diffuser to generate the desired screen viewing angles.

In a further embodiment of a method for manufacturing a high contrast optical path corrected screen, the screen of FIG. 6 is formed by optically coupling a Fresnel lens to a planarized lenticular lens. A radiation sensitive region is then optically coupled to the opposite side of the planarized lenticular lens. Radiation from a radiation source that substantially simulates the angular light profile, incident direction and location of the end-use projection engine is directed through the Fresnel lens and planarized lenticular lens and is focused onto the black stripe region. The focused areas become clear apertures post processing of the black stripe region. A symmetric diffuser can be added to increase the angle of view of the high contrast optical path corrected rear projection screen. The focused light pattern in the clear aperture region can correct for various different design deviations from the traditional normal incidence collimated light exposures used in traditional screens. The optical path corrected light path can allow for higher resolution and precise locations for the clear apertures in the black stripe material. This can also enable multiple layers of a black stripe material can be used for higher ambient light absorbing qualities. The black stripe region provides contrast enhancement and may contain black particles or tints or light sensitive material such as Chromalin from DuPont. A positive or negative exposure Chromalin or other material may be used to achieve spatially varying light transmissive and light absorptive regions. Similarly, the contrast enhancement region may be a black material that is ablated by exposure through the optical elements. The contrast enhancement region may also be transparent spheres in close proximity to a black absorbing medium. The Fresnel lens may be a hybrid type with collimation from TIR, refraction, or a combination of both. The resulting screen may be combined with substrates, hardcoats, anti-glare or anti-reflection (such as multi-layer interference coatings or moth-eye structures) features as is commonly known in the field.

Figure 7:
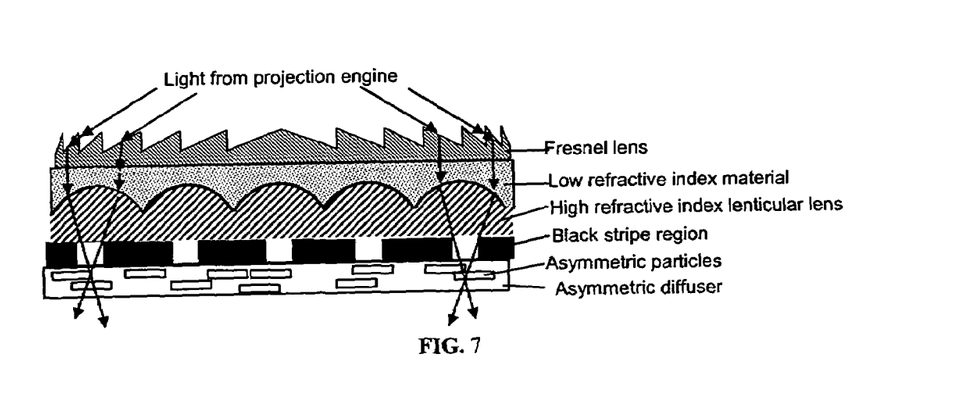
FIG. 7 is a cross-sectional side view of one embodiment of a high contrast optical path corrected screen of the invention wherein a Fresnel lens is optically coupled to an optical element of the invention with a black stripe region between the second element ("high refractive index lenticular lens"), and an asymmetric diffuser.

FIG. 7 illustrates a further embodiment of a high contrast optical path corrected screen wherein an asymmetric diffuser is used to provide more design flexibility and control over the viewing angles. A Fresnel lens is optically coupled to a planarized lenticular lens. A black stripe region is optically coupled to the planarized lenticular lens and a region containing asymmetric particles. As shown in FIG. 7, the particles are aligned perpendicular to the lenticules. It is understood that they can be at an angle theta between 0 degrees and 90 with respect to the lenticules depending on the desired viewing angles. Typically single lenticular based screens need only a minor amount of diffusing in the vertical axis. This can be accomplished more efficiently by using an asymmetric diffuser containing particles aligned perpendicular to the lenticules. The asymmetric diffusion enables a brighter display (or longer lasting light source) and can also reduce ambient light backscatter from the diffuser which increases the display contrast. Various means for achieving asymmetric diffusion may be introduced in regions between the refractive lens portion of the Fresnel lens and the opposite surface of the contrast enhancing layer. The asymmetric diffusion in the regions could be derived from scattering from asymmetric particles, surface relief profiles (with or without refractive index matching), indices of refraction or other techniques such as scattering from cylindrical or other shaped particles of varying sizes or an asymmetric surface relief profile. These particles may be aligned by stretching or other alignment techniques. Methods and designs of asymmetric diffusers and their use with projection screens are described in U.S. application Ser. No. 11/200,592, filed Aug. 10, 2005, which is incorporated herein by reference.

Figure 8:
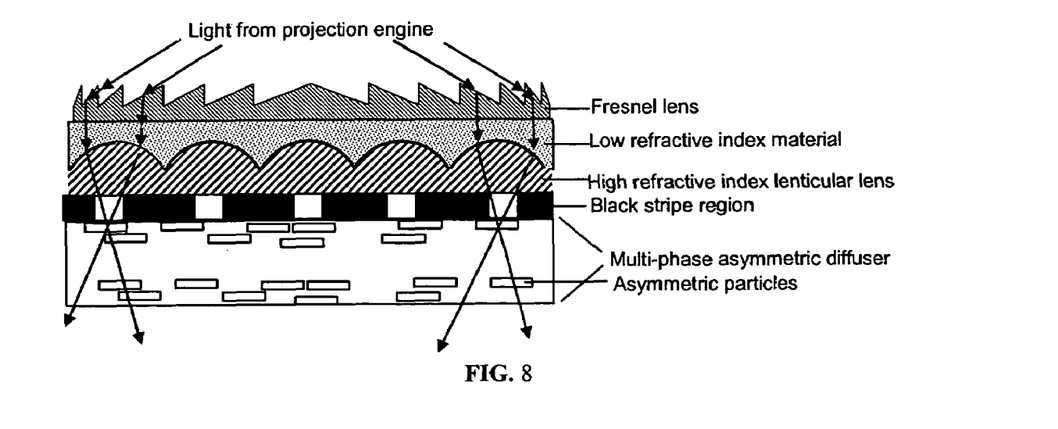
FIG. 8 is a cross-sectional side view of one embodiment of a high contrast optical path corrected screen of the invention wherein a Fresnel lens is optically coupled to an optical element of the invention, with a black stripe region between the second element ("high refractive index lenticular lens"), and a multi-phase asymmetric diffuser.

FIG. 8 illustrates an embodiment of a high contrast optical path corrected screen wherein a multi-phase asymmetric diffuser is used to provide design flexibility and control over the viewing angles and a reduced speckle contrast. A Fresnel lens is optically coupled to a planarized lenticular lens. A black stripe region is optically coupled to the planarized lenticular lens and a multi-phase light scattering region. The multi-phase light scattering region contains two or more light scattering regions separated by a substantially non-scattering region. This region reduces the visibility of speckle (lowers the speckle contrast) on the imaging screen. Multi-phase scattering regions composed of different combinations of symmetric and asymmetric particles and their possible locations are detailed further in U.S. application Ser. No. 11/200,592, filed Aug. 10, 2005.

Figure 9:
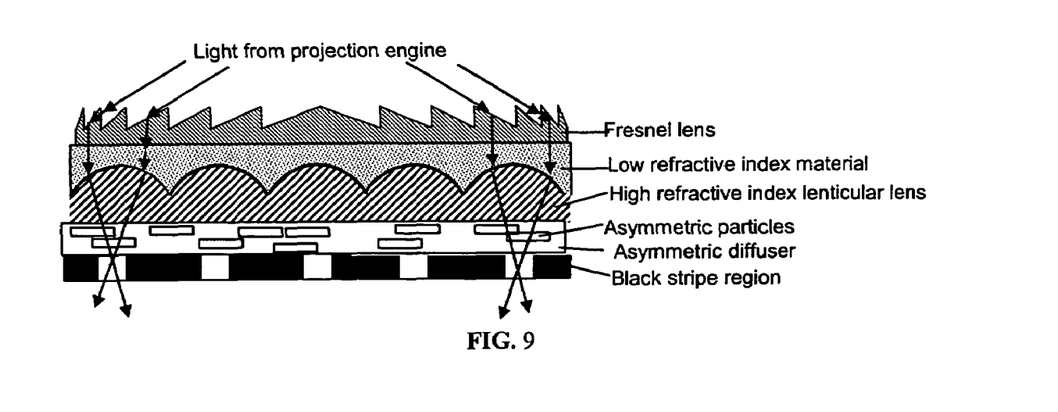
FIG. 9 is a cross-sectional side view of one embodiment of a high contrast optical path corrected screen of the invention featuring an asymmetric diffuser between the second element ("high refractive index lenticular lens"), and a black stripe region.

FIG. 9 illustrates an embodiment of a high contrast optical path corrected screen wherein an asymmetrically scattering region is located between the planarized lenticular lens and the black stripe region. A Fresnel lens is optically coupled to the planarized lenticular lens. Light from a projection engine will be substantially collimated in the horizontal and vertical directions by the Fresnel lens and this light will then be focused in the horizontal direction through the asymmetric diffuser. The asymmetric diffuser will scattering the light in the vertical direction, thus the light will still pass through the vertical clear apertures.

In a further embodiment of a method for manufacturing a high contrast optical path corrected screen, the screen of FIG. 9 is formed by optically coupling a Fresnel lens to a planarized lenticular lens. An asymmetric light scattering region is optically coupled to the opposite face of the planarized lenticular lens. A radiation sensitive region is then optically coupled to the opposite face of the light scattering region. Radiation from a radiation source that substantially simulates the angular light profile, incident direction and location of the end-use projection engine is directed through the Fresnel lens and is focused in the horizontal direction by the planarized lenticular lens and diffused in the vertical direction by the asymmetric scattering region. The shape of the exposed region represents the optically corrected path that includes the light source angular light profile, incidence angle, position and also the effects of these offsets on light passing through the lenticular lens and the asymmetric diffuser. As compared to the embodiment illustrated in FIG. 7, the optical path correction of the embodiment of FIG. 9 can include the path corrections due to the asymmetric diffuser. This can enable a more completely corrected system. Additionally, by placing the diffuser before the black stripe region, less light will backscatter because the surface exposed to ambient light contains clear or black non-scattering regions. This will increase the screen contrast.

Figure 10:
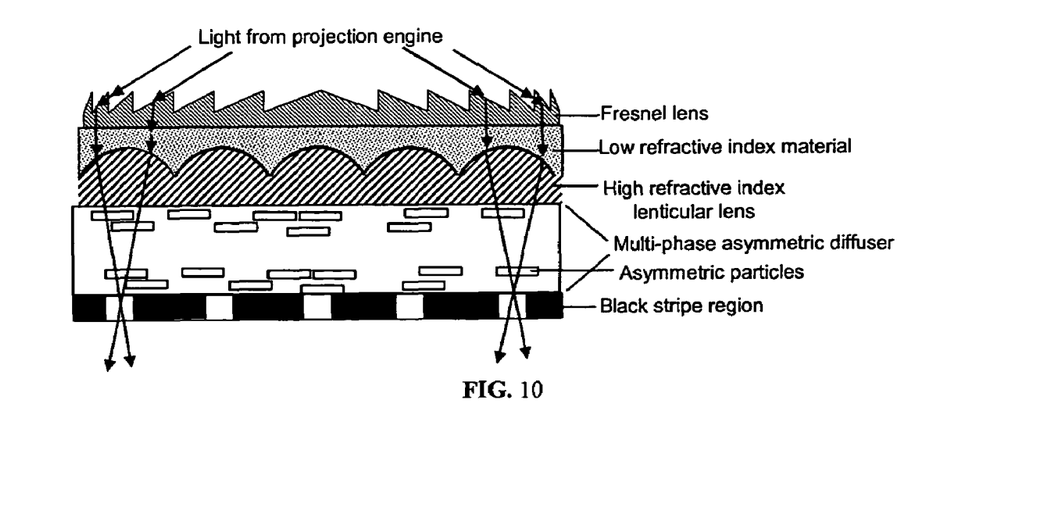
FIG. 10 is a cross-sectional side view of one embodiment of a high contrast optical path corrected screen of the invention wherein a Fresnel lens is optically coupled to an optical element of the invention, with a multi-phase asymmetric diffuser between the second element ("high refractive index lenticular lens"), and a black stripe region.

FIG. 10 illustrates an embodiment of a high contrast optical path corrected screen wherein a multi-phase, asymmetrically scattering diffuser is located between the planarized lenticular lens and the black stripe region. A Fresnel lens is optically coupled to the planarized lenticular lens. Light from a projection engine will be substantially collimated in the horizontal and vertical directions by the Fresnel lens and this light will then be focused in the horizontal direction through the asymmetric diffuser. The asymmetric diffuser will scattering the light in the vertical direction, thus the light will still pass through the vertical clear apertures. The asymmetric diffuser is multi-phase and contains two or more regions containing light scattering particles separated by a substantially non-scattering region. By using a multi-phase diffuser, the speckle contrast of the screen is reduced, thus reducing the appearance of speckle.

In a further embodiment of a method for manufacturing a high contrast optical path corrected screen, the screen of FIG. 10 is formed similar to the method for FIG. 9, except that the single phase asymmetric diffuser is replaced by a multi-phase diffuser that reduces the speckle contrast.

Figure 11:
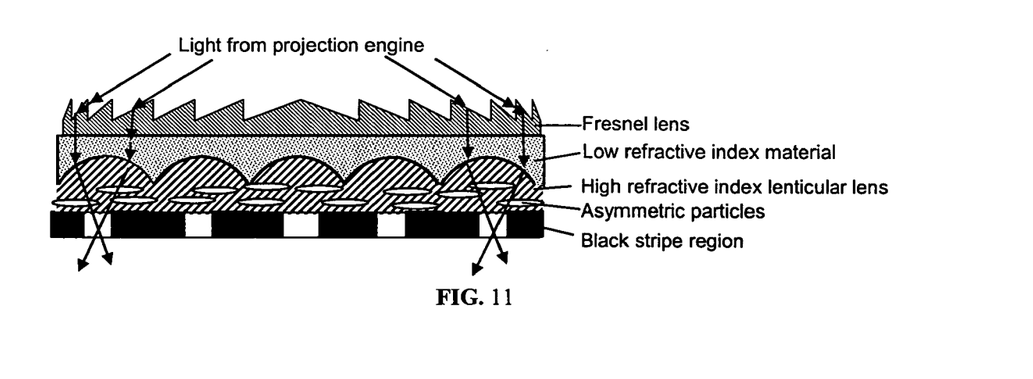
FIG. 11 is a cross-sectional side view of one embodiment of a high contrast optical path corrected screen of the invention wherein a Fresnel lens is optically coupled to an optical element of the invention, featuring a second element ("high refractive index lenticular lens") containing asymmetric particles that is optically coupled to a black stripe region.

FIG. 11 illustrates an embodiment of a high contrast optical path corrected screen wherein an asymmetrically shaped particles are located within a planarized lenticular lens. A Fresnel lens is optically coupled to the planarized lenticular lens. A black stripe region is optically coupled to the opposite face of the planarized lenticular lens. Light from a projection engine will be substantially collimated in the horizontal and vertical directions by the Fresnel lens and this light will then be focused in the horizontal direction and diffused in the vertical direction by the planarized lenticular lens containing asymmetric particles. The focused and diffused light will pass through the vertical clear apertures. By incorporating the asymmetric particles within the planarized lenticular lens after the refracting element, a further reduction in thickness can be achieved. The shape of the particles may be asymmetric or symmetric. The particles may be located within the lenticules, the substrate, or both and their may be more than one region of scattering particles (multi-phase) with combinations of symmetric or asymmetric particles as discussed in U.S. application Ser. No. 11/200,592, filed Aug. 10, 2005. The corresponding methods for manufacturing and designs disclosed are incorporated herein as contemplated configurations for this invention.

Figure 12:
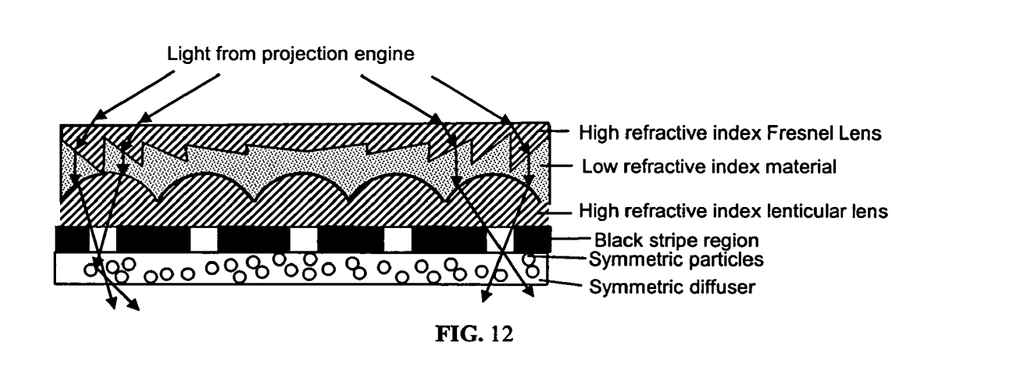
FIG. 12 is a cross-sectional side view of one embodiment of a high contrast optical path corrected screen of the invention featuring a third substantially planar element, having a third refractive index $n_{x3}$, a third light-receiving surface, and a third light-transmitting surface, (wherein the third light-transmitting surface and the first light-receiving surface cooperatively form an array for redirecting light transmitted through the third and first elements), and featuring an symmetric diffuser.

FIG. 12 illustrates an embodiment of a high contrast optical path corrected screen wherein a planarized Fresnel lens is optically coupled to a planarized lenticular lens. A black stripe region is optically coupled to the planarized lenticular lens and a symmetric diffuser as illustrated in FIG. 12. Light from a projection engine will be substantially collimated in the horizontal and vertical directions by the planarized Fresnel lens. A refractive only Fresnel lens with the configuration of FIG. 12 can collimate light from larger angles than the configuration of FIG. 6. Thus, this screen configuration can be used for thinner projection systems or larger screen size projection systems. The light from the planarized Fresnel lens will then be focused in the horizontal direction by the planarized lenticular lens and will pass through the clear apertures in the black stripe region. The angular spread of light will be further increased in the horizontal and vertical directions by passing through the symmetric diffuser. The planarized Fresnel and lenticular lenses may be manufactured separately and combined using traditional lamination or coupling techniques. Alternatively, the low refractive index material could be coated onto the lenticules such that when combined, by lamination and UV curing for example, the low refractive index material provides the low refractive index needed for the refraction (and possible TIR) for both lenses. During production, the exposure of the black stripe region optically corrects for the angles and paths through the planarized Fresnel and Lenticular lenses.

Figure 13:
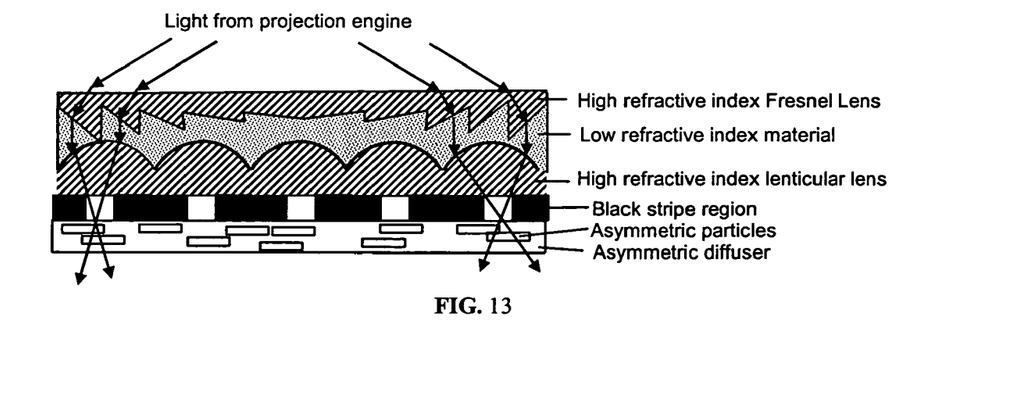
FIG. 13 is a cross-sectional side view of an embodiment of the high contrast optical path corrected screen of FIG. 12, featuring an asymmetric diffuser.

FIG. 13 illustrates a further embodiment of a high contrast optical path corrected screen wherein an asymmetric diffuser is used with planarized Fresnel and lenticular lenses to provide more design flexibility and control over the viewing angles. The symmetric diffuser of FIG. 12 is replaced with an asymmetric diffuser to provide improved performance. The asymmetric diffusion enables a brighter display (or longer lasting light source) and can also reduce ambient light backscatter from the diffuser which increases the display contrast. Variations of the diffuser and embodiments similar to those in the description of FIG. 7 are possible.

Figure 14:
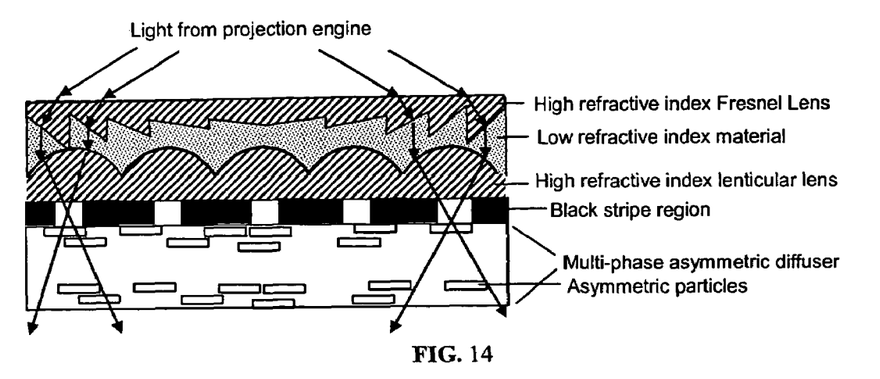
FIG. 14 is a cross-sectional side view of an embodiment of the high contrast optical path corrected screen of FIG. 12, featuring a multi-phase asymmetric diffuser.

FIG. 14 illustrates an embodiment of a high contrast optical path corrected screen containing planarized Fresnel and lenticular lenses and a multi-phase asymmetric diffuser. The multi-phase asymmetric diffuser is used to provide design flexibility, control over the viewing angles, and a reduced speckle contrast. A planarized Fresnel lens is optically coupled to a planarized lenticular lens. A black stripe region is optically coupled to the planarized lenticular lens and a multi-phase light scattering region. The multi-phase light scattering region variations are similar to those in the description for FIG. 8 such as symmetric and asymmetric particles and more than one light scattering region.

Figure 15:
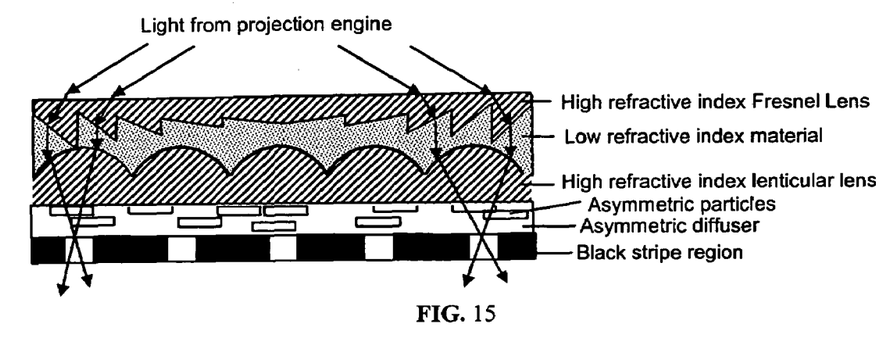
FIG. 15 is a cross-sectional side view of an embodiment of the high contrast optical path corrected screen of FIG. 12, featuring an asymmetric diffuser between the second element and a black stripe region.

FIG. 15 illustrates an embodiment of a high contrast optical path corrected screen with a planarized Fresnel and lenticular lens and an asymmetric scattering region. By placing the asymmetric diffuser between the planarized lenticular lens and the black stripe region, the optical path correction can include the diffuser and the display contrast is increased by the reduced backscatter as discussed in the description of FIG. 9. Similarly, in further embodiment of a method of manufacturing the high contrast optical path corrected screen of FIG. 15, the optical path correction needed for the end-use projection engine is recorded in the black stripe region and increases the throughput and contrast of the display.

Figure 16:
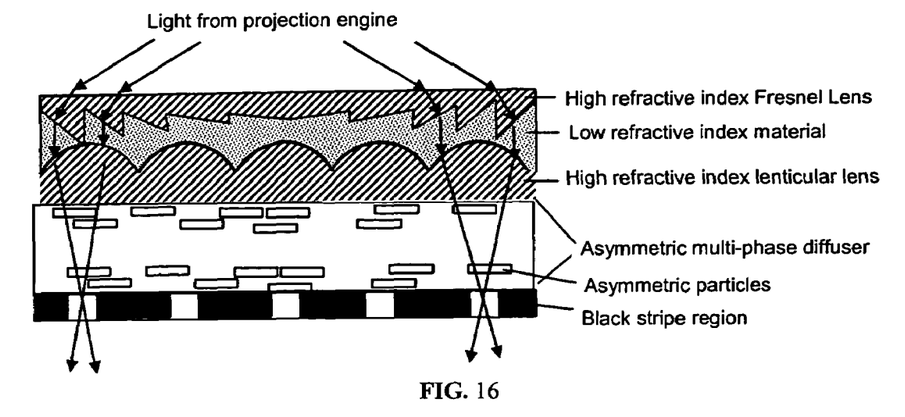
FIG. 16 is a cross-sectional side view of an embodiment of the high contrast optical path corrected screen of FIG. 12, featuring a multi-phase asymmetric diffuser between the second element and a black stripe region.

FIG. 16 illustrates an embodiment of a high contrast optical path corrected screen containing a planarized Fresnel and lenticular lens and a multi-phase asymmetric diffuser located between the lenticular lens and the black stripe region. The multi-phase asymmetric diffuser is used to provide design flexibility, control over the viewing angles, and a reduced speckle contrast. The embodiment of FIG. 16 offers improved speckle reduction over the configuration of FIG. 15. In a further embodiment of a method of manufacturing the high contrast optical path corrected screen of FIG. 16, the optical path correction needed for the end-use projection engine is recorded in the black stripe region and increases the throughput and contrast of the display.

Figure 17:
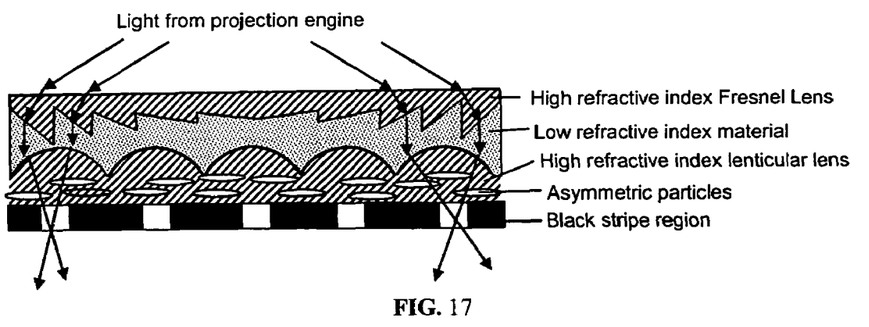
FIG. 17 is an embodiment of the high contrast optical path corrected screen of FIG. 12, featuring a second element containing asymmetric particles.

FIG. 17 illustrates an embodiment of a high contrast optical path corrected screen wherein the traditional Fresnel lens of FIG. 11 is replaced a planarized Fresnel lens. As discussed in the descriptions in FIG. 12 the planarized Fresnel lens used in this configuration can collimate light from larger angles. As a result, the screen of FIG. 17 can be larger or the display system can be thinner than that of FIG. 11.

Figure 18:
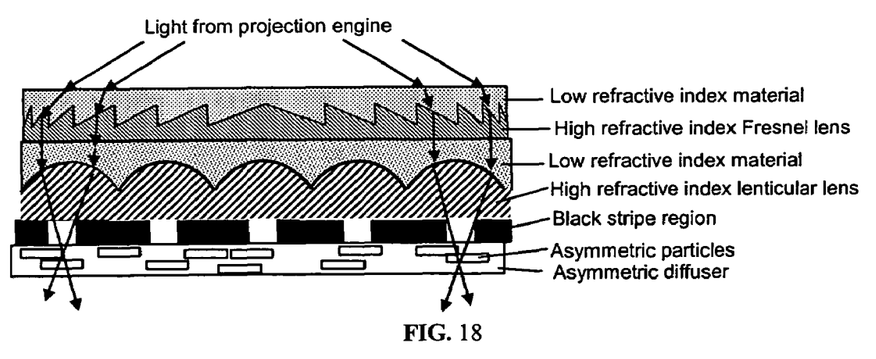
FIG. 18 is a cross-sectional side view of an embodiment of the high contrast optical path corrected screen of FIG. 12, featuring a Fresnel lens coupled to a screen element of the invention, with the blades of the Fresnel lens and the lenticular lens interface oriented toward the light source.

FIG. 18 illustrates an embodiment of a high contrast optical path corrected screen wherein the traditional Fresnel lens of FIG. 7 is planarized. By planarizing the Fresnel lens, optical coatings such as anti-reflection coatings can be used on the surface. Also, the Fresnel lens can be optically coupled to a substrate or other optical element in the system. This allows more freedom in design. Also, particle contamination and scratching problems can be reduced by using the planarized layer that may be easily cleaned or possibly polished.

Figure 19:
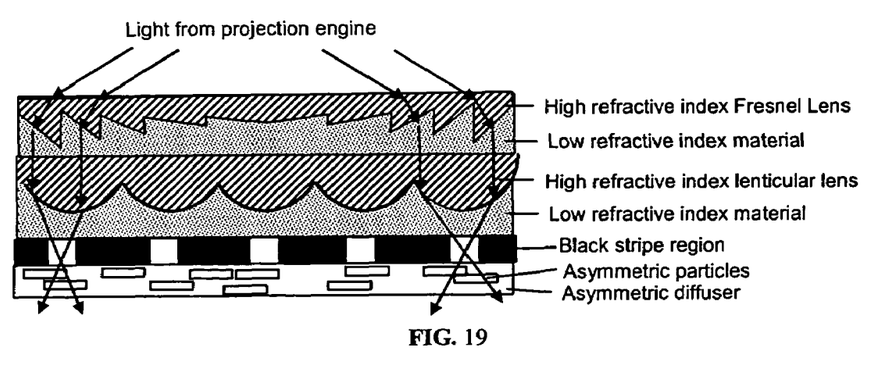
FIG. 19 is a cross-sectional side view of an embodiment of the high contrast optical path corrected screen of FIG. 12, featuring a Fresnel lens coupled to a screen element of the invention, with the blades of the Fresnel lens and the lenticular lens interface oriented away from the light source.

FIG. 19 illustrates an embodiment of a high contrast optical path corrected screen wherein the planarized lenticular lens of FIG. 13 is oriented with the high refractive index region on the projection engine side of the display. By orienting the lenticular lens in this configuration, the focal length of the lenticules can be shorter than the thickness of the lenticular lens. This can decrease the size of the clear apertures and increase the screen contrast. In the prior art, this can not be easily achieved because the air gap needed makes the registration of the stripes with the lenticules very difficult.

In a further embodiment of a method for manufacturing a high contrast optical path corrected screen, the screen of FIG. 19 is formed by optically coupling a planarized Fresnel lens to a planarized lenticular lens. A black stripe region is optically coupled to the lenticular lens and radiation simulating that of the end-use projection system is collimated by the planarized Fresnel lens and focused by the planarized lenticular lens into the black stripe region. By optically coupling the Fresnel lens to the lenticular lens before exposure, the optical path can be corrected for different display configurations simply by positioning the exposing light in a different location in a roll-to-roll based manufacturing process.

Variations of the preceding embodiments are included within the scope of this invention. This include, but are not limited to locating the symmetric, asymmetric, or combination of particles within different regions or elements of the screen. These can include locating the particles within the lenticular lens (the high or low refractive index region), the black stripe region or in a separate region optically coupled to at least one of the regions. The light scattering region may be multi-phase. The elements of the screen can be oriented such that light from the projection engine first reaches the high or low refractive index region.

The different variations in features and designs of the high contrast optical path corrected screen described herein can be envisioned and include one or more combinations of the features described below:

1. Elements contained within the screen: Fresnel lens; lenticular lens; light scattering region; black stripe region; anti-reflection coatings; surface relief structures; anti-glare coatings; hardcoat coatings; substrates; adhesion region; low refractive index region; high refractive index region; air gap;
2. Fresnel lens type: Refractive; TIR based; aspheric; hybrid; surface relief; planarized
3. Fresnel lens orientation: high refractive index region closer to projection engine; low refractive index region closer to the projection engine; centered off-axis; centered on-axis;
4. Lenticular lens type: surface relief; planarized; spherical based lenticules; aspherical lenticules;

5. Lenticular lens orientation: high refractive index region closer to projection engine; low refractive index region closer to the projection engine; horizontal, vertical;
6. Spacing between the screen elements that include Fresnel lens, lenticular lens, black stripe region, light scattering regions: air gap; optically coupled.
7. Scattering region:
    a. Scattering region location: within the lenticules, within the substrate of the lenticular lens; between the lenticular lens and the black stripe region; within the black stripe region; between the black stripe region and the viewer of the display; multiple regions such that the regions are separated by a non-diffusing region (multi-phase).
    b. Diffusing particle shapes: Symmetric; or asymmetric particles; or a combination of both.
    c. Diffusing particles refractive index: average refractive index $n_p$ wherein $|n_p-n_m|>0.001$; refractive index $n_{px}$ and $n_{py}$, in the x and y directions respectively, wherein $|n_{px}-n_m|>0.001$; $|n_{py}-n_m|>0.001$; or $|n_{py}-n_m|>0.001$ and $|n_{px}-n_m|>0.001$.
    d. Asymmetric particle alignment: substantially parallel to the lenticules; substantially perpendicular to the lenticules; or at an angle theta with respect to the lenticules.
8. Black stripe region: capable of being exposed with selective adhesion properties (Chromalin); capable of being ablated; sensitive to optical radiation; sensitive to thermal radiation; more than one region of black stripe material;
9. Light path correction possibilities: projection engine location; projection engine incident angle; projection engine light divergence; Fresnel lens focal length ("over collimated" or "under-collimated"); Fresnel lens centered off-axis; Fresnel lens tilt; orientation of Fresnel lens; de-centered Fresnel lens; planarized Fresnel lens; lenticular lens focal length; lenticular lens orientation; lenticular lens refractive index; planarized lenticular lens; lenticular lens tilt; lenticular lens pitch; angular spread due to light scattering region; off-axis performance of light scattering region;

Other high contrast optical path corrected screen configurations and methods of manufacturing can be envisioned within the scope of this invention.

EXAMPLES

Preferred embodiments of the present invention are illustrated in the following Example(s). The following examples are given for the purpose of illustrating the invention, but not for limiting the scope or spirit of the invention.

Example 1

The planarized Fresnel lens of FIG. 3 can be created by casting a Fresnel lens structure into a high refractive index material such as Nitto Denko's high-refractive index thermosetting polymer capable of reaching a refractive index of 1.76 (See Nitto Denko Press Release, 11 Nov. 2003, at http://www.nitto.com/company/release/03_11_11/index.html). A planarization layer is coated onto the lens side of the planarized Fresnel lens and consists of a low refractive index material such as an aerogel. Since the planarized Fresnel lens has a substantially flat surface on either side, an anti-reflection coating can be applied to either side. The lens features should be designed to reflect or refract based on the refractive index differences between the high and low refractive index materials.

Example 2

The planarized lenticular lens of FIG. 4 can be created by casting a lenticular lens structure into a high refractive index material such as Nitto Denko's high-refractive index thermosetting polymer capable of reaching a refractive index of 1.76 (See Nitto Denko Press Release, 11 Nov. 2003, at http://www.nitto.com/company/release/03_11_11/index.html). The lenticules should be designed to provide the correct focal distance, normally at the edge of the film, and the lenticules may be aspherical in shape. A planarization layer is coated onto the lens side of the planarized lenticular lens and consists of a low refractive index material such as an aerogels. An anti-reflection coating can be applied to the low refractive index side. A black stripe region is optically coupled to the high refractive index side of the planarized lenticular lens. This may be light sensitive material such as Chromalin from DuPont. After exposing to UV light, the Chromalin can be processed to create black stripes in the non-exposed region.

Example 3

The high contrast optical path corrected screen of FIG. 9 can be created by casting the traditional Fresnel lens on a substrate that contains the planarized lenticular lens of Example 2. Other techniques such as embossing may be used. An asymmetric diffusion diffuser is optically coupled to the lenticular lens by lamination. A light sensitive material such as Chromalin from DuPont is optically coupled to the asymmetric diffuser. Diverging light from UV light source is directed toward the Fresnel lens. The light source is positioned in a location and directed at an angle to the screen that simulates the angle and direction of the light from the end-use projection engine. The light is refracted/reflected to near collimation by the Fresnel lens and directed to the planarized lenticular lens. The planarized lenticular lens focuses the light in the horizontal direction into the asymmetric diffuser. The asymmetric diffuser spreads the light in the vertical direction and does not substantially scatter light in the horizontal direction. The light then creates a striped pattern of exposure in the Chromalin. Post-processing, this region contains clear apertures in those striped regions of exposure that correspond to the optically corrected path of the light from the end-use projection engine.

Example 4

The high contrast optical path corrected screen of FIG. 15 can be created by optically coupling the high refractive index planarized Fresnel lens of Example 1 with the high refractive index planarized lenticular lens of Example 2. In a preferred embodiment, a Fresnel lens structure and a lenticular lens structure are both cast into a high refractive index material such as the Nitto Denko thermosetting polymer noted above. These two lenses are optically coupled by a low refractive index adhesive that provides the low refractive index region for both lenses. This provides a thinner screen with a single planarization step that effectively planarizes the lens combination. An asymmetric diffuser is laminated to the substrate of the lenticular lens. A light sensitive material such as Chromalin from DuPont is optically coupled to the asymmetric diffuser. Diverging light from UV light source is directed toward the planarized Fresnel lens. The light source is positioned in a location and directed at an angle to the screen that simulates the angle and direction of the light from the end-use projection engine. The light is refracted/reflected to near collimation by the planarized Fresnel lens and directed to the planarized lenticular lens. The planarized lenticular lens focuses the light in the horizontal direction into the asymmetric diffuser. The asymmetric diffuser spreads the light in the vertical direction and does not substantially scatter light in the horizontal direction. The light then creates a striped pattern of exposure in the Chromalin. Post-processing, the region corresponding to the exposure pattern contains clear apertures that correspond to the optically corrected path of the light from the end-use projection engine.

EQUIVALENTS

Those skilled in the art will recognize, or be able to ascertain using no more than routine experimentation, numerous equivalents to the specific procedures described herein. Such equivalents are considered to be within the scope of the invention. Various substitutions, alterations, and modifications may be made to the invention without departing from the spirit and scope of the invention. Other aspects, advantages, and modifications are within the scope of the invention. The contents of all references, issued patents, and published patent applications cited throughout this application are hereby incorporated by reference. The appropriate components, processes, and methods of those patents, applications and other documents may be selected for the invention and embodiments thereof.

What is claimed is:

1. An optical element comprising:
    a) a first substantially planar element having a first refractive index $n_{x1}$, a first light-receiving surface, and a first light-transmitting surface;
    b) a second substantially planar element having a second refractive index $n_{x2}$, a second light-receiving surface, and a second light-transmitting surface;
    wherein the first light-transmitting surface and the second light-receiving surface cooperatively form an array for redirecting light transmitted through the first and second elements, and $n_{x1} \ne n_{x2}$.

2. The optical element of claim 1, wherein at least one of the first light-receiving surface and the second light-transmitting surfaces are substantially planar.

3. The optical element of claim 1, wherein the array is a Fresnel lens.

4. The optical element of claim 1, wherein the array is a lenticular lens.

5. The optical element of claim 1, wherein the interface between the first light-transmitting surface and the second light-receiving surfaces is optically coupled.

6. The optical element of claim 1, wherein at least one of the first and second elements scatters light.

7. The optical element of claim 6, wherein at least one of the first and second elements contains light scattering particles.

8. The optical element of claim 7, wherein the light scattering particles are asymmetric or non-spherical.

9. The optical element of claim 1, further comprising at least one optical layer on one of the first light-receiving surface and the second light-transmitting surfaces, wherein the optical layer is selected from the group consisting of an anti-reflective coating, a reflective coating, anti-glare surface, and a contrast-enhancing region.

10. The optical element of claim 9, wherein the second optical layer is a second contrast-enhancing region optically coupled to the first contrast enhancing region.

11. The optical element of claim 9, wherein the optical layer is a contrast enhancing region comprising sub-regions varying in concentration of a visible light absorbing material.

12. The optical element of claim 9, wherein the optical layer is a contrast enhancing region and the contrast enhancing region comprises a substantially uniform concentration of a visible light absorbing material.

13. The optical element of claim 1, further comprising a third element having an array for redirecting light disposed on the first light-receiving surface.

14. The optical element of claim 1 wherein the optical element is a collimating lens.

15. The optical element of claim 14 further comprising a reflective region.

16. A projection screen comprising a first substantially planar element having a first refractive index $n_{x1}$, a first light-receiving surface, and a first light-transmitting surface, and a second substantially planar element having a second refractive index $n_{x2}$, a second light-receiving surface, and a second light-transmitting surface, wherein the first light-transmitting surface and the second light-receiving surface cooperatively form an array for redirecting light transmitted through the first and second elements, and $n_{x1} < n_{x2}$; a Fresnel lens element disposed on the first light-receiving surface; and a contrast enhancing region disposed on the second light-transmitting surface, wherein the contrast enhancing sub-regions are alternating light transmissive and light absorbing stripes.

17. The projection screen of claim 16, wherein on-axis diverging light from a projection engine is substantially directed through the low concentration sub-regions of the contrast enhancing region.

18. The projection screen of claim 16, wherein off-axis diverging light from a projection engine is substantially directed through the low concentration sub-regions of the contrast enhancing region.

19. The projection screen of claim 16, wherein the Fresnel lens is a de-centered Fresnel lens, and diverging light from a projection engine is substantially directed through the low concentration sub-regions of the contrast enhancing region.

20. The projection screen of claim 16, further comprising a light scattering element disposed between the second element and the contrast enhancing region.

21. The projection screen of claim 16, further comprising a light scattering element disposed on the contrast enhancing region.

22. A projection comprising the projection screen of claim 16.

23. A method of manufacturing an optical element comprising the steps of
    a) providing a substantially planar light-transmitting element having a refractive index $n_{xa}$, a first surface comprising an array for redirecting light, and a second, substantially smooth, surface;
    b) providing a second substantially planar light-transmitting element having a refractive index $n_{xb}$, a third surface comprising an array for redirecting light which cooperates in intimate contact with the first surface, and a fourth, substantially smooth, surface; and
    c) providing a contrast enhancing region optically coupled to the second or fourth, substantially smooth, surface;
    wherein at least one of the first or second light-transmitting elements have dispersed therein light scattering particles, and $n_{xa} < n_{xb}$.

24. The method of claim 23, wherein the array is formed by embossing or casting.

25. The method of claim 23, wherein the contrast enhancing region is formed by selectively directing electromagnetic radiation through the first and second materials, exposing the contrast enhancing region, and processing to achieve light transmissive and light absorptive sub-regions.

26. The method of claim 25, wherein the electromagnetic radiation substantially corresponds to the light output profile position, divergence, size, and angle of incidence from a projection engine.

27. The method of claim 26, wherein the contrast enhancing region is formed by exposing an electromagnetic light absorbing region to electromagnetic radiation such that the sub-regions corresponding to higher intensities of electromagnetic radiation become more transmissive due to an absorbing material ablation process.

28. The method of claim 26, wherein the contrast enhancing region is formed by exposing an electromagnetic light absorbing region to electromagnetic radiation such that the sub-regions corresponding to spatially varying intensities of electromagnetic radiation are created by processing the region by adding or removing light absorbing material to achieve transparent and absorptive sub-regions.

29. The method of claim 26, wherein the electromagnetic radiation is ultraviolet light.

* * * * *